Figure 1:
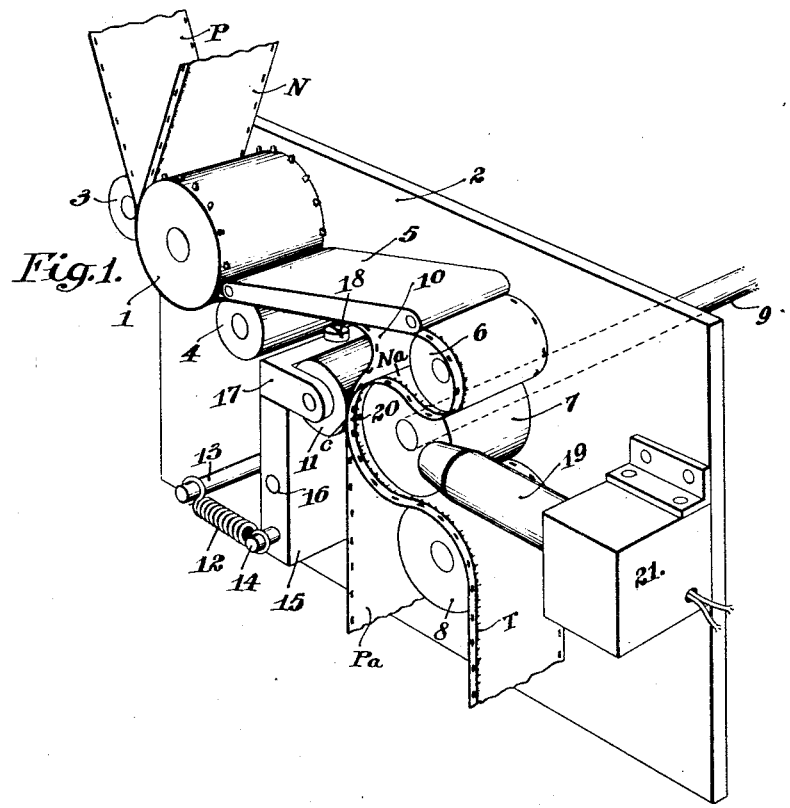

Nov. 9, 1937.     A. V. BEDFORD     2,098,371
PRINTER
Filed Dec. 29, 1933

INVENTOR:
Alda V. Bedford,
BY T. R. Goldsborough
ATTORNEY.

Patented Nov. 9, 1937

2,098,371

UNITED STATES PATENT OFFICE 2,098,371

PRINTER

Alda V. Bedford, Collingswood, N. J., assignor to Radio Corporation of America, a corporation of Delaware Application December 29, 1933, Serial No. 704,436

9 Claims. (Cl. 95—75)

My invention relates to a photographic printer, and more particularly to a contact printer especially adapted for the printing of photographic sound records.

Recent advances in the art of sound recording have made it possible to record sound over a wider range and with greater fidelity than was formerly possible. Similar advances in sound reproducing apparatus have made it possible to reproduce the improved records with equal fidelity, provided positive prints could be made from the improved negatives without loss of detail.

The most common method thus far employed for making positives of photographic sound records has been by contact printing from the negatives. Now, it is well known that films are subject to shrinkage and that not all films shrink equally. Contact printers of the prior art employed for producing prints of sound records have practically all been designed to correct for a fixed shrinkage of the negatives, but since it is physically impossible for all negatives to be in the same condition with reference to the positive raw stock at the time of printing, it is clear that some slippage must take place between the two films during printing. To correct for this, various proposals have been made, among them being to extend the printing area over a length such that the degree of slippage which may occur over a short length of film will be small compared to the printing area, so that any noises introduced by slippage will be "blurred out", so to speak. However, extending the printing area does not eliminate slippage and, together therewith, results in loss of detail, particularly at the higher frequencies, so that printers of the prior art have proved inadequate to provide positives that will have the same detail and fidelity as the original recordings.

It is the primary object of my invention to provide an improved contact printer that will be free from the aforementioned defects characteristic of printers of the prior art and that will produce prints having practically as good detail as the original negative.

Another object of my invention is to provide an improved printer of the type specified in which the negative and positive films will travel past the printing point without any slippage therebetween regardless of the amount of shrinkage that the negative has suffered.

Still another object of my invention is to provide an improved printer of this type which will be capable of handling films having different lengths per given number of sprocket holes in such a way as to accommodate the length of one of said films, for a predetermined number of sprocket holes, to that length of the other of said films which includes the same number of sprocket holes without, however, permitting any slippage between the two films.

A further object of my invention is to provide an improved printer of the aforementioned type in which automatic adjustment will be effected between the two films in accordance with the degree of shrinkage of the negative relative to the positive to insure uniform travel of both films at the printing point.

Still another object of my invention is to provide an improved printer of the type described in which a line contact of the two films at the printing point will be insured.

It is also an object of my invention to provide an improved printer of the type referred to which is inexpensive of manufacture and which is positive and highly efficient in operation.

In accordance with my invention, both films are fed into the printer at the same sprocket hole rate, that is, both films are advanced so that the same number of sprocket holes of each is fed into the printer in a given unit of time. The negative film is maintained under tension between the feed sprocket and the printing point, but the raw positive is provided with a free loop between said sprocket and the printing point, and advantage is taken of the difference in the sprocket hole pitch between the two films and of the natural stiffness of the positive to cause automatic adjustment of said loop in such a manner as to compensate for this difference in sprocket hole pitch and thus prevent relative slippage between the two films at the printing point. At the same time, the two films are maintained in line contact at the printing point and a thin line of light is projected thereon whereby a print of fine detail may be obtained.

Figure 2:
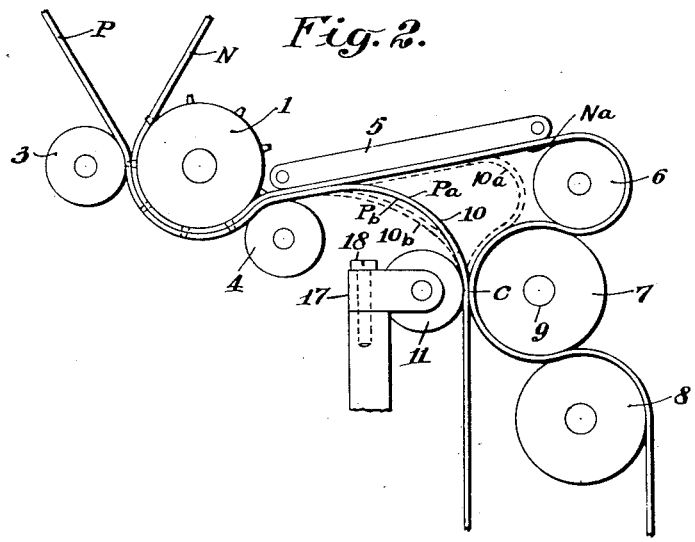

The novel features that I consider characteristic of my invention are set forth with particularity in the appended claims. The invention itself, however, both as to its organization and method of operation, together with additional objects and advantages thereof, will best be understood from the following description of a specific embodiment, when read in connection with the accompanying drawing, in which Figure 1 is a perspective view of one form of my improved printer, and Figure 2 is a side elevation thereof but with the optical system removed.

Referring to the drawing more in detail, I have shown a negative film N and a positive film P being fed into the printer from a pair of reels (not shown) by a sprocket 1 mounted on a supporting plate 2, a roller 3 serving to hold the two films against the sprocket 1 and in frictional contact with each other. Presumably, the negative N is the older film and has shrunk, if either film has changed its length, although this is not necessarily so. However, let it be assumed that the negative N has shrunk so that its overall length is shorter than the overall length of the positive raw stock P and that the shrinkage has not been uniform along its entire length.

The negative N is passed, under tension, over a roller 4, beneath a guide plate 5, the purpose of which will appear hereinafter, around a guide roller 6, back around a drum 7 of less width than the film N so that the sound record T thereon, which is to be copied onto the positive P, extends beyond the free end thereof, and thence forwardly again and around a second guide roller 8 to a second sprocket (not shown) which feeds the negative to a take-up reel. The rollers 3, 4, 6, and 8 are mounted freely on shafts supported by the plate 2 while the drum 7 is mounted on a drive shaft 9 to be driven thereby at a constant speed in any suitable manner. Since the negative N has no loops and is tight between the two sprockets, its linear velocity is constant with respect to the roller 3.

The positive film P, instead of being under tension like the negative N, is passed over the roller 4 and thence, in an unrestrained path under the guide plate 5 and beneath the negative N, directly to the roller 7, being provided with a free loop 10 in its path of travel to the roller 7. A pressure roller 11 maintains the adjacent surfaces of the two films in contact with each other at the printing point C under the influence of a spring 12 which is secured at one end to a pin 13 fixed to the plate 2 and at the other end to a pin 14 extending from a block 15 which is pivotally mounted on a horizontal pin 16, also fixed to the plate 2. The roller 11 is rotatably supported on a yoke 17 which is mounted on the block 15 for movement about a vertical pin 18. This construction permits the roller 11 to partake of universal movement about the pins 16 and 18 to insure a line contact of the films N and P against the drum 7 at the printing point C. An optical system 19 is so designed as to focus upon the sound record T, at the printing point or line of contact C of the two films, a fine line of light 20 from a light source within the casing 21, and thus the sound record T is copied with great fidelity onto the positive P provided, of course, no slippage occurs between the two films N and P at their contact line C.

Initially, that is when the films or tapes are first threaded in the printer, the positive may be set with its free loop 10 in substantially the solid line position shown in the drawing. As clearly evident from the drawing, both the negative N and the positive P are fed into the printer at the same sprocket hole rate by reason of the fact that both films mesh with the teeth of the sprocket 1.

Since the film P has a greater sprocket hole pitch than the film N, it is clear that, for a given number of revolutions of the sprocket 1, a somewhat greater length of the positive P will be advanced than the negative N, the difference in length depending upon the difference in sprocket hole pitch of the two films. As the sprocket hole pitch of the negative N decreases at the sprocket 1 relative to that of the positive P, a greater length of the positive P will be fed forward relative to the negative N than previously, and this will cause the loop 10 to become larger, or assume substantially the dotted line position 10a, under the guidance of the guide plate 5. On the other hand, as the sprocket hole pitch of the negative N increases relative to that of the positive P, a lesser length of positive film will be fed forward relative to the negative than previously, and this will cause the loop 10 to shorten, or assume substantially the dotted line position 10b. Thus, the size or position of the loop 10 is determined by the relative pitches of the two films N and P, and if the loop 10 grows in size, it is necessary for more of the film P to pass the drum 7 to keep the loop in bounds, while if the loop 10 diminishes in size, it is necessary for less film P to pass the drum 7 in a given time interval. At the same time, however, the adjacent surfaces Na of the negative N and Pa of the positive P must both move past the printing point C at the same lineal speed if there is to be no slippage between the two films. This is automatically accomplished by the curving of the positive P in such a manner as to shorten or lengthen the effective length of its surface Pa which is driven by contact with the negative N at the drum 7, depending, respectively, on whether the loop is enlarged or shortened.

The linear speed of the surface Na is, of course, determined by the rotary speed of the drum 7 and the radial distance of the surface Na from the center of the drum. This radial distance, it will be noted, is equal to the radius of the drum 7 plus the thickness of the film N. Since the surface Pa is in contact with and is driven by the surface Na by reason of the pressure roller 11 pressing the two films together, the surface Pa of the positive travels with the same linear speed, at the printing line C, as the surface Na. Now, as the loop moves to the position 10a, the surface Pa wraps itself around the surface Na on the drum 7. This shortens the surface Pa and slightly lengthens the opposite surface Pb of the film P and, since the linear speed of the surface Pb is a function of its radial distance from the center of the drum 7 which, of course, is greater than the radial distance of the surface Pa from the center of the drum 7 by the thickness of the film P, it is clear that the surface Pb will advance at a slightly greater linear speed than the surface Pa. Thus, the rate of passage of the positive P between the roller 11 and the drum 7 will be slightly increased.

Suppose, now, that the sprocket hole pitch of the negative has increased relative to that of the positive so that the loop 10 has assumed its dotted line position 10b. The surface Pb is then compressed somewhat at the loop and it becomes slightly shorter than the surface Pa. Remembering that the surface Pa still travels past the printing line C with the same linear speed as the surface Na, it is clear that the surface Pb will advance at a slightly slower lineal speed on the roller 11. This will decrease the rate of passage of the positive P.

In this manner, by taking advantage of the difference in sprocket hole pitch of the two films N and P and the natural stiffness of the positive film P to cause the loop 10 to vary in the manner heretofore described, immediately in advance of and up to the printing point, both films may be advanced past the printing point C in such a manner that their contacting surfaces Na and Pa advance past this point at exactly the same linear speed and without any slippage between the two films involved in the printing operation.

While I have shown and described a certain specific embodiment of my invention, it will be apparent to those skilled in the art that many modifications thereof are possible. For example, instead of driving the films from the drum 7, they may be driven from the sprocket 1 or from all of the sprockets geared together, with equally satisfactory results. Also, in place of the pivotal mounting 18 for the yoke 17, the yoke may be coupled to the block 15 in spaced relation thereto by a flat torsion spring which will permit movement of the yoke 17 about a vertical axis at right angles to the pin 16. Also, if desired, the guide plate may be replaced by a movable roller which is adapted, under the influence of a weak spring, to follow the loop 10 in its various positions, or the guiding device may be entirely dispensed with. In either of the latter cases, threading of the film will be simplified. Moreover, processes of printing other than photographic might be used, such as contact printing by dyes, ink, or the like, or by engraving, etching, or magnetizing, while employing the principle herein disclosed of feeding the tapes through the printing machine. Many other changes will also readily suggest themselves to those skilled in the art. My invention, therefore, is not to be limited, except insofar as is necessitated by the prior art and by the spirit of the appended claims.

I claim as my invention:

1. In a tape feeding machine wherein an operation is performed upon the tapes, means for feeding forward at the same reference mark rate a pair of tapes each having a different length for a given number of reference marks thereon, a member located adjacent the operating point and having an arcuate surface, means for directing the shorter one of said tapes under tension past said member in contact with said arcuate surface, and means cooperatively associated with said member for pressing the longer of said tapes into engagement with said shorter tape along only a line at said arcuate surface, said feeding means being spaced from said operating point to provide a loop in said longer tape between said feeding means and said line, and said longer tape being free to travel from said feeding means to said line of engagement in a variable path dependent upon the instantaneous length thereof between said feeding means and said line of engagement whereby to vary the curvature of said loop, the variations in said loop causing said longer tape to more or less change its curvature at and immediately prior to said line of engagement whereby to cause the contacting surfaces of said tapes to travel past said line of engagement at the same linear speed.

2. In a photographic printer, means for feeding forward at the same sprocket hole rate a pair of films each having a different length for a given number of sprocket holes, a member located adjacent the printing point and having an arcuate surface, means for directing the shorter one of said films under tension past said member in contact with said arcuate surface, and means cooperatively associated with said member for pressing the longer of said films into engagement with said shorter film along only a line at said arcuate surface, said feeding means being spaced from said printing point to provide a loop in said longer film between said feeding means and said line, and said longer film being free to travel from said feeding means to said line of engagement in a variable path dependent upon the instantaneous length thereof between said feeding means and said line of engagement whereby to vary the curvature of said loop, the variations in said loop causing said longer film to more or less change its curvature at and immediately prior to said line of engagement whereby to cause the contacting surfaces of said films to travel past said line of engagement at the same linear speed.

3. The invention set forth in claim 2 characterized by the addition of means for keeping said loop within predetermined bounds.

4. In a photographic printer, means for feeding forward at the same sprocket hole rate a pair of films each having a different length for a given number of sprocket holes, a member located adjacent the printing point and having an arcuate surface, means for directing the shorter one of said films under tension past said member in contact with said arcuate surface, and means cooperatively associated with said member for pressing the longer of said films against said shorter film along only a line at said printing point, said feeding means being spaced from said printing point to provide a loop in said longer film between said feeding means and said line, and said longer film being free to travel from said feeding means to said printing line in a variable path dependent upon the instantaneous length thereof between said feeding means and said printing line whereby to vary the curvature of said loop, the variations in said loop causing said longer film to more or less change its curvature at and immediately prior to said printing line whereby to cause the contacting surfaces of said films to travel past said printing line at the same linear speed.

5. In a photographic printer, means for feeding forward at the same sprocket hole rate a pair of films each having a different length for a given number of sprocket holes, a roller located adjacent the printing point, means for directing the shorter one of said films under tension around and in contact with said roller, and a pressure roller cooperatively associated with said first named roller for pressing the longer of said films into engagement with said shorter film against said first named roller along only a line, said feeding means being spaced from said printing point to provide a loop in said longer film between said feeding means and said line, and said longer film being free to travel from said feeding means to said line of engagement in a variable path dependent upon the instantaneous length thereof between said feeding means and said line of engagement whereby to vary the curvature of said loop, the variations in said loop causing said longer film to more or less change its curvature at and immediately prior to said line of engagement whereby to cause the contacting surfaces of said films to travel past said line of engagement at the same linear speed.

6. In a photographic printer, means for feeding forward at the same sprocket hole rate a pair of films each having a different length for a given number of sprocket holes, a roller located adjacent the printing point, means for directing the shorter one of said films under tension around and in contact with said roller, and a pressure roller cooperatively associated with said first named roller for pressing the longer of said films into engagement with said shorter film against said first named roller along only a line at said printing point, said feeding means being spaced from said printing point to provide a loop in said longer film between said feeding means and said line, and said longer film being free to travel from said feeding means to said printing line in a variable path dependent upon the instantaneous length thereof between said feeding means and said printing line whereby to vary the curvature of said loop, the variations in said loop causing said longer film to more or less change its curvature at and immediately prior to said printing line whereby to cause the contacting surfaces of said films to travel past said printing line at the same linear speed.

7. The invention set forth in claim 6 characterized by the addition of means for supplying a fine beam of light to said films at said line.

8. In a photographic printer, the combination of means for feeding forward at the same sprocket hole rate a pair of films each having a different length for a given number of sprocket holes, means for advancing said films along separate paths toward the printing point, means for maintaining said films in contact along a line at said printing point, and means for directing a fine beam of light onto said films at said printing point, said feeding means being spaced from said printing point to provide a loop in the longer of said films between said feeding means and said line, and said longer film being free to alter its path in advance of said printing point in accordance with the difference in sprocket hole pitch of said films at said feeding means to vary the curvature of its path immediately in advance of the printing point and thereby to effect travel of the contacting surfaces of both said films past said printing line at the same linear speed.

9. In a moving picture film printing machine the combination of a film sprocket for simultaneously feeding the positive and negative films from their respective supply reels, a rotatable drum spaced from said film feeding sprocket, a pair of film guiding members for guiding one of said films around the drum and in frictional contact therewith, a pressure roller of smaller diameter than said drum under which the other film is passed, and by which it is forced into frictional contact with the first said film on said drum, at an angle to the direction of the movement of the films after leaving said feeding means in order to form a loop in said other film which stretches the emulsion side of the said other film before making contact with the first named film, thus causing both films to travel at a constant speed at their point of contact regardless of any changes in the length of said other film and means for photographically printing the negative film onto the positive film at their point of contact.

ALDA V. BEDFORD.